Oct. 21, 1952   J. E. LAWVER   2,614,692
RECOVERY OF METALLIC MINERALS FROM PHOSPHATE-SILICA ORES
       CONTAINING MINOR AMOUNTS OF THE METALLIC MINERALS
Filed June 8, 1948   3 Sheets-Sheet 3
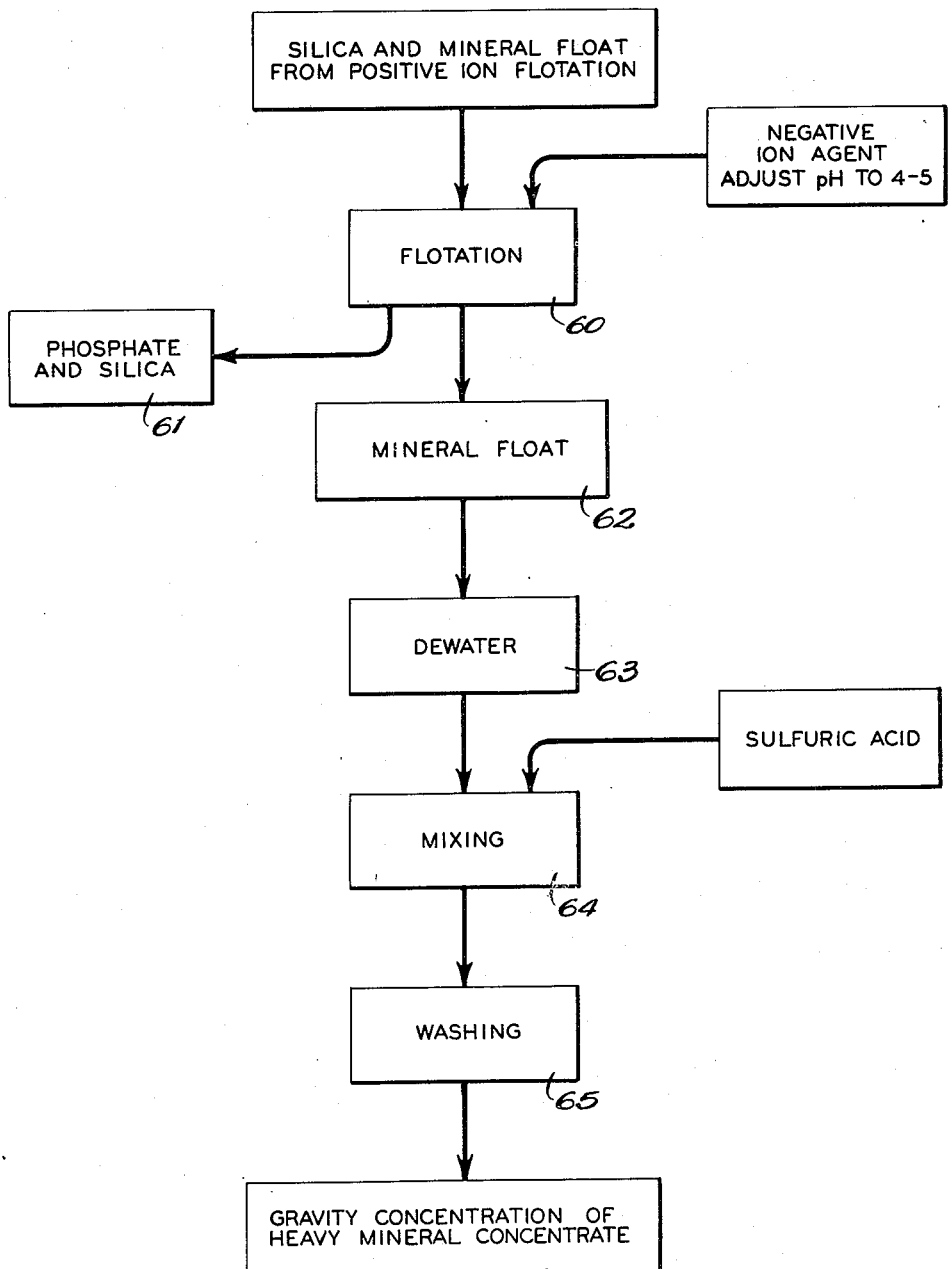

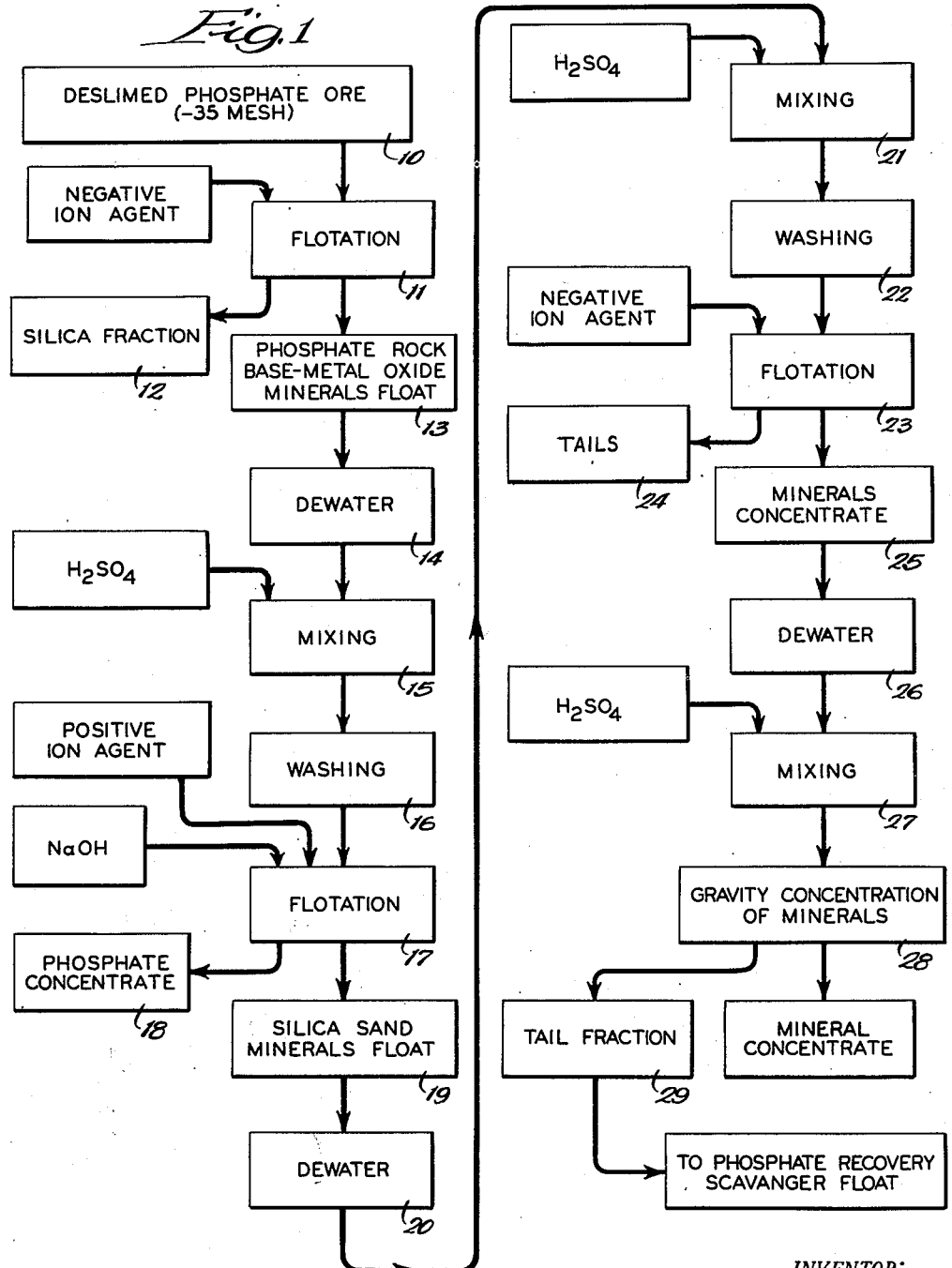

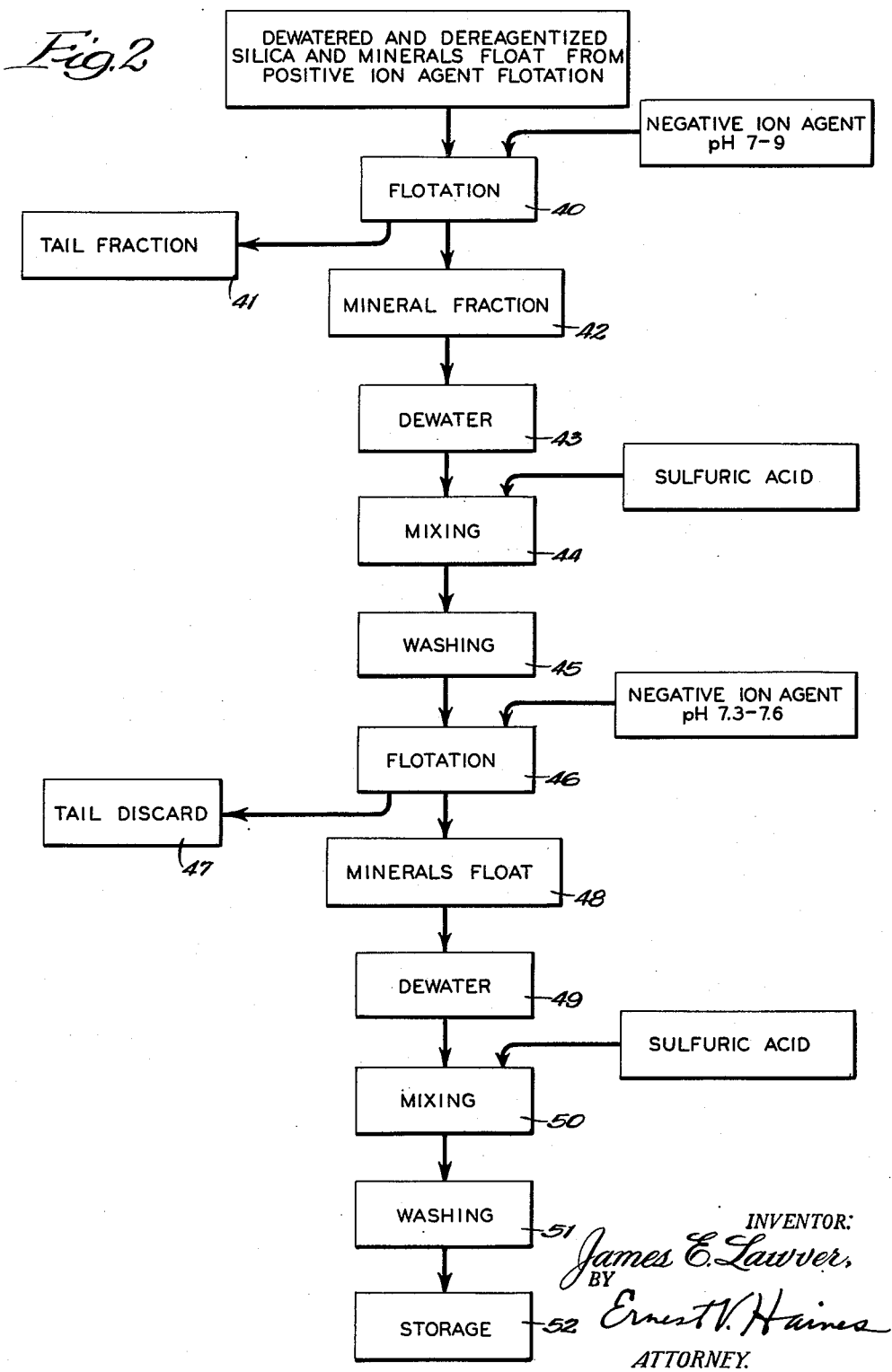

Patented Oct. 21, 1952

2,614,692

UNITED STATES PATENT OFFICE 2,614,692

RECOVERY OF METALLIC MINERALS FROM PHOSPHATE-SILICA ORES CONTAINING MINOR AMOUNTS OF THE METALLIC MINERALS

James E. Lawver, Lakeland, Fla., assignor to International Minerals & Chemical Corporation, a corporation of New York Application June 8, 1948, Serial No. 31,841

13 Claims. (Cl. 209—166)

This invention relates to the recovery of certain valuable mineral constituents from ores containing the same. More particularly, the invention relates to the recovery of metallic minerals such as ilmenite, rutile and zircon, as well as certain other minerals from ores containing substantial amounts of phosphate rock and siliceous material.

The occurrence of minerals such as ilmenite ($FeTiO_3$), zircon ($ZrSiO_4$), and rutile ($TiO_2$) is widespread. Large deposits occur in the beach sands of Australia, as well as in the beach sands of Florida. Deposits of rutile occur in the Piney River area of Virginia, which deposits contain about 45% by weight of ilmenite. Up to the present time it has been common practice to process or beneficiate only those ores which contain a rather high percentage of such valuable minerals. For example, it has been found that the raw materials must contain at least 40% by weight of such minerals in order to be amenable to flotation procedures whereby the desired constituents of the ore are floated away from siliceous gangue, or silica is floated away from the desired mineral constituents. Several processes have been developed whereby flotation procedures have been adapted to the recovery of such minerals from their ores. For example, zircon is separated from other constituents such as rutile, ilmenite, quartz, and monazite when these occur in mineral sands found in certain areas along the beaches in Australia. The sand is preferably washed and reagentized with dilute soap solutions and certain frothing agents or extenders such as pine oil, cresol, or higher alcohols, to form a float. Other reagents which have been used include oleic acid, glycerides, and sulfonated hydrocarbons. The zircon may be floated away from silica and the other desirable mineral constituents, the zircon-bearing froth separated therefrom, and the other mineral constituents separated from the tailings by subsequent flotation procedures or by suitable gravity methods. The latter include subjecting an aqueous suspension of the tailings to a shaking operation upon riffled tables, taking advantage of the difference in specific gravity of each mineral constituent to effect a separation. Silica, having a lower specific gravity than the desired metallic constituents, passes over the riffles of the tables in a stream of water; whereas the heavier metallic constituents tend to settle to the surface of the shaking table and are carried along the riffles to various points of concentration. It has also been proposed to separate zircon from rutile and ilmenite by subjecting a mixture of the ore and water to the action of a soap solution, with or without mineral acids, in order to float the zircon. Rutile and ilmenite may be recovered by continuing the treatment. Attempts have also been made to float ilmenite away from silica and other impurities by employing anionic reagents such as oleic acid, tall oil, fatty acids, and soaps of these materials, as well as anionic-type wetting agents. These methods have achieved only mediocre results.

It has been found that in order to achieve, by methods described above, the concentration of the desired metallic mineral constituents from ores containing the same, in an economical manner, the concentration of said minerals in the ore must be at least about 40% by weight. Furthermore, the operational conditions during flotation procedures must be controlled very carefully in order to produce satisfactory results. Even in such cases, a plurality of flotation operations are required in order to produce concentrates of metallic minerals of sufficient purity for industrial purposes. Concentrates of these metallic minerals must usually contain at least about 85% by weight of said minerals in order that the concentrates may be adapted for use in certain processes for the production of various chemical compounds from these minerals, or adapted for use in certain physical processes to produce materials which are used directly in certain industries. One of the most recent methods which is adaptable to the concentration of ilmenite from beach sands containing the same is described in Patents Nos. 2,431,559 and 2,431,560, issued to Ira B. Humphreys. These patents disclose an apparatus and a process whereby metallic mineral-containing ores, such as beach sands, may be gravitationally subjected to the action of a helical concave apparatus whereby the minerals, in a liquid slurry, are separated from each other based upon their individual specific gravities. In such an apparatus, an ore containing only about 5% by weight of high gravity minerals may be treated to produce a concentrate containing as high as 85% by weight of such mineral constituents.

It has recently been discovered that traces of certain metallic minerals such as ilmenite, rutile, zircon, sillimanite, as well as minor amounts of garnet, tourmaline, and monazite, occur in association with silica and phosphatic rock in the Florida phosphate fields. The total concentration of these minerals in the phosphatic matrix is less than about 0.1% by weight. By subjecting the phosphatic rock to flotation operations for the recovery of the phosphatic values contained therein, in accordance with well-known and established procedures, the metallic mineral content of the tailings of such flotation operations may be increased to 2–4% by weight. Thus, in a typical flotation circuit, phosphatic rock in a suitable divided state (35 mesh) is reagentized in an aqueous pulp with fatty acids or tall oil at a pH above 8.0, usually between about 8.5 and about 9.0. A concentrate containing mainly tricalcium phosphate is collected, together with some silica. This concentrate is scrubbed with mineral acid in order to remove reagents therefrom, and is then further reagentized in an aqueous pulp with a cationic or positive ion-type reagent such as a water-soluble salt of a long-chain aliphatic amine. A flotation of this pulp achieves the concentration of the silica and depresses the phosphate rock constituents. In the past, the silica concentrate has been discarded or recycled into the phosphate flotation section after removing the cationic reagents. It has now been found that the silica concentrate produced by flotation with cationic reagents contains about 2 to 4% by weight of the previously mentioned metallic minerals. The composition of the silica float averages about 60 to 70% by weight of silica, about 35 to 25% by weight of tricalcium phosphate, the remainder consisting of the aforementioned heavy minerals, together with other impurities. A material containing only 2 to 4% by weight of metallic minerals is not commercially adaptable to industrial processes which now utilize such metallic minerals and has therefore been previously discarded.

It is an object of the invention to provide a novel process for the recovery of metallic minerals from ores containing same in association with phosphatic and siliceous matter.

It is a further object of the invention to provide a novel process for the recovery of metallic minerals from phosphatic rock.

It is a further object of the invention to provide a novel process for the recovery of metallic minerals from phosphatic ores wherein the concentration of said minerals in said ore is less than 0.5% by weight.

It is a further object of the invention to provide a novel process for the recovery of metallic minerals from phosphatic-siliceous ores wherein the concentration of said minerals is below that concentration which heretofore has been deemed necessary to economically achieve a marketable concentrate of said minerals from ores containing same.

The above objects, as well as others which will become apparent upon a complete understanding of the invention which is hereinafter fully described, are accomplished by subjecting a finely divided phosphatic-siliceous ore, which contains base-metal oxide type metallic minerals such as ilmenite and rutile, and including zircon, to at least one flotation operation in the presence of a composition selected from the group consisting of carboxyl-containing negative ion agent having an affinity for phosphate values, and nitrogenous positive ion agent having an affinity for siliceous gangue in combination with said negative ion agent, said flotation being conducted at a pH between about 4 and about 5 when said combination is employed, and at a pH between 7 and 8, inclusive, when negative ion agent is employed; and separating a concentrate rich in metallic minerals. By carrying out flotation procedures with such reagents and within the previously described pH ranges, it is possible to obtain an economical concentration of such metallic minerals from phosphatic-siliceous ores whereby concentrates containing up to 85% by weight of such ores are readily obtainable. Heretofore, a metallic mineral-containing ore was required to contain at least 40% by weight of said metallic minerals before it was considered economical to concentrate such minerals therefrom by flotation procedures.

As examples of anionic or negative ion agents which may be used in carrying out a flotation procedure in accordance with the instant novel process for the concentration of metallic minerals which are present in association with silica and phosphatic materials, may be listed the higher fatty acids (for example, oleic, stearic, and palmitic acids), natural resin acids, tall oil, naphthenic acids, alkyl sulfonated fatty acids, acid esters of high molecular weight aliphatic alcohols, and the soaps of such materials. As examples of cationic or positive ion reagents which are useful in carrying out flotation procedures in combination with negative ion agents at a pH of between about 4 and about 5, may be listed nitrogenous positive ion agents such as the higher molecular weight aliphatic amines containing at least one alkyl group having 12 to 20 carbon atoms, and their water-soluble addition salts with mineral and organic acids, esters of amino alcohols with high molecular weight fatty acids, the higher alkyl-substituted isoureas and their water-soluble salts, high molecular weight aliphatic quaternary ammonium bases and their water-soluble salts, alkyl-substituted pyridinium and quinolinium water-soluble salts, and others.

As previously mentioned herein, a silica concentrate which contains positive ion agents may be produced in phosphate rock flotation circuit according to procedures which are currently employed in the production of high-grade phosphatic concentrates by flotation methods which are well known to the phosphate industry. In order to achieve a recovery of the metallic minerals from such a silica concentrate, it is now proposed to add to this concentrate a negative ion agent of the type previously described, together with an appropriate amount of acidic material to give the silica concentrate a pH of between about 4 and about 5. The resultant mixture, in an aqueous pulp, is subjected to flotation whereby the metallic minerals are selectively floated away from silica and tricalcium phosphate. In order to further concentrate the metallic minerals contained in such a concentrate, said concentrate is then "de-reagentized" by treating it with an acidic material such as a mineral acid—for example, sulfuric acid and hydrochloric acid. The acid-treated concentrate is washed until it is substantially neutral, and the washed concentrate is then subjected to at least one flotation operation in the presence of a suitable amount of negative ion agent of the type previously herein described, the flotation being conducted at a pH of between 7 and 8, inclusive.

Alternatively, the silica float obtained in the phosphate flotation section of a phosphate flotation recovery plant may be directly "de-reagentized" in the manner previously described, and the acid-washed concentrate washed free of acidic material until it is substantially neutral. The washed concentrate is then reagentized with negative ion agent of the type previously described, and subjected to a flotation operation at a pH between 7 and 8, inclusive, in order to concentrate the metallic minerals.

It has been found that a pH between about 4 and about 5 is highly critical when a combination of negative ion and positive ion agents are employed, and that a pH of between 7 and 8, inclusive, is highly critical when only negative ion agent is employed. Although recovery of metallic minerals may be achieved to some extent by operating outside of these pH ranges, it has been found that substantial amounts of both silica and phosphate rock are also floated or collected together with the metallic mineral constituents of the ore, thereby resulting in a concentrate containing comparatively low percentages of the desired metallic constituents. On the other hand, if the pH ranges are restricted to those previously mentioned, a concentrate containing a high percentage of metallic minerals is obtained. The high selectivity of the flotation reagents described herein, within the prescribed pH ranges, for metallic minerals in preference to phosphatic and siliceous materials, is a highly important feature of the instant novel process and permits excellent recovery of small amounts of metallic minerals present in phosphate-silica mixtures.

In some instances it may be preferable to conduct a preliminary, so-called "rougher" flotation operation whereby the phosphatic-siliceous ore which contains the metallic minerals is subjected to a flotation operation at a pH between 7 and 9, separating a "rougher" concentrate and subjecting said "rougher" concentrate to a subsequent flotation operation with negative ion agent at a pH between 7 and 8, inclusive. Such a combination of flotation procedures combines the features of high recovery and selectivity, thereby achieving maximum recovery of the metallic minerals. By employing a "rougher" flotation operation at a pH of between 7 and 9 followed by a "cleaner" flotation operation of the concentrate produced from the "rougher" flotation step, it is possible to produce a concentrate containing as high as 85% by weight of the desired metallic mineral constituents originally contained in the ore.

It has been found that anionic or negative ion agents such as fatty acids—for example, oleic, stearic, and palmitic acids—natural resin acids such as abietic and dihydroabietic acids, tall oil, red oil, naphthenic acids such as hexahydrobenzoic acid, di- and tetrahydronaphthoic acids, etc., and soaps of such agents, as well as mixtures of such agents, are particularly useful in the concentration of metallic minerals from phosphatic-siliceous ores. Included within the term "soaps" of such negative ion or anionic type reagents are the alkali metal and alkaline earth metal soaps, such as sodium, potassium, aluminum, calcium, and magnesium soaps. Soaps may also be formed by reacting such reagents with ammonia or aqueous solutions thereof. Organic bases such as dimethyl and diethyl amine, pyridine, quinoline, aniline, and similar reagents also form flotation reagents when reacted with carboxylic reagents, and are considered to be within the scope of the term "soaps" and negative ion or anionic reagent. Since the tricalcium phosphate is also floated by such reagents, the pH of the pulped ore during the flotation, particularly in the final or "cleaner" flotation operation, is maintained between 7 and 8, inclusive. As previously mentioned, it has been found that the metallic minerals are preferentially or selectively floated by negative ion agents having an affinity for phosphatic values within this pH range in preference to tricalcium phosphate. In conducting the final or "cleaner" flotation operation, it has been found that red oil is particularly useful when combined with pine oil as a frothing agent and caustic soda or caustic potash as a reagent to achieve required pH adjustment.

When metallic minerals are concentrated from phosphatic-silica ores by flotation, in the presence of the combination of the negative ion and positive ion agents, the pH of the pulp during flotation must be maintained between about 4 and about 5. This may be readily accomplished by adding a sufficient amount of acidic material to the pulp either prior to or subsequent to the reagentizing step in order to adjust the pH of the pulp to this range. Either inorganic mineral acids such as sulfuric, hydrochloric and nitric acids, or organic acids such as formic and acetic acids may be used; but for reasons of economy, acids such as sulfuric and hydrochloric are normally employed. In certain instances it is advantageous to employ mixtures of such acids. When a flotation is conducted in the presence of negative ion agent at a pH between 7 and 8, inclusive, it is preferable to adjust the pH of the flotation pulp to this particular range by adding an alkaline material which may be either inorganic or organic in nature. For example, inorganic basic materials such as caustic soda, caustic potash, alkali bicarbonate such as

KHCO₃ and NaHCO₃, alkali carbonate such as Na₂CO₃, K₂CO₃, CaCO₃, etc., and other similar reagents are useful. Organic reagents such as pyridine, low molecular weight amines such as dimethyl amine, ethylamine, isopropylamine, quinoline, and similar reagents have been found to be useful. Here again, for reasons of economy, it is preferable to employ caustic soda or alkali carbonates to produce the proper pH adjustment.

More particularly, the instant novel process involves subjecting a phosphatic-siliceous ore which may contain less than 50% by weight of metallic minerals in association with phosphatic and siliceous matter to at least one flotation operation at a pH between 7 and 8, inclusive, in the presence of negative ion agent having an affinity for phosphate values. As previously mentioned herein, it is sometimes advisable to subject the ore to at least one "rougher" flotation operated at a pH between 7 and 9 in the presence of negative ion agent having an affinity for phosphate values. For these flotation operations it has been found that a reagent consisting of a composition selected from the group consisting of fatty acids such as those previously mentioned herein, natural resin acids, tall oil, red oil, naphthenic acids such as those previously mentioned, and soaps of such materials, are particularly useful. The metallic mineral-containing ore, which preferably has a −35 mesh size, is reagentized with one or more of these reagents in the presence of water at a solids content between about 25 and about 50% by weight, and a sufficient amount of alkaline material of the type previously herein described is added in order to adjust the pH of the resultant pulp to between 7 and 9. The resultant reagentized pulp is subjected to a flotation operation, and a concentrate which contains the metallic minerals previously herein described, together with some silica and phosphatic material, is collected. The rougher concentrate is treated with an acidic material—for example, sulfuric acid— in an aqueous pulp, in order to substantially remove the reagents therefrom. The acid-treated concentrate is washed with water until it is substantially neutral, and is then further reagentized with a negative ion composition selected from the group previously described. A frothing agent such as pine oil or fuel oil may be added. A sufficient amount of alkaline reagent, such as caustic soda, is added to give the resultant flotation pulp a pH of between 7 and 8, inclusive. A flotation operation is then carried out, and concentrates are produced which contain between about 60 and about 85% by weight of metallic minerals consisting of ilmenite, rutile, and zircon, in a ratio of about 3:1:3, together with considerably smaller quantities of epidote, tourmaline, garnet, monazite and titanite. It has been found that usually only one "rougher" and one "cleaner" flotation operation are required to produce this degree of metallic mineral concentration from a silica-phosphate composition containing about 2 to 4% by weight of metallic minerals.

When employing a combination of negative ion and positive ion agents of the type previously herein described, one "rougher" flotation operation conducted at a pH between about 4 and about 5 achieves a metallic mineral concentration of about 500% based upon the initial metallic mineral content of the ore. After removing the reagents from the concentrate by scrubbing or agitation with acidic material—for example, sulfuric acid—and subjecting said concentrate after a washing operation to a "cleaner" flotation operation at a pH between 7 and 8, inclusive, with reagent selected from the group consisting of fatty acids, resin acids, tall oil, red oil, naphthenic acids and soaps of such materials, a final concentrate containing between about 60 and about 85% by weight of metallic minerals in association with very small amounts of silica and phosphatic material is produced.

The metallic mineral concentrates produced in accordance with the instant novel process may be subsequently dried and subjected to further concentration by means of electrostatic and/or electromagnetic devices which are commonly used for this purpose. Zircon is essentially non-magnetic and is separated with the tailings. Ilmenite and rutile are separated based upon their differential magnetic and/or dielectric properties.

It has also been found that the metallic mineral concentrate produced from a phosphatic siliceous ore by carrying out a flotation procedure in accordance with the novel methods previously herein described may be "de-reagentized" with acidic material—for example, sulfuric acid—and washed substantially free of such acidic reagents. The resultant washed concentrate can then be slurried with water to produce a mixture, preferably containing between about 20 and about 40% by weight of solids, which is then permitted to flow in a downward spiral or helical path in order to further concentrate the metallic minerals. This procedure may be conducted in accordance with the process disclosed by Ira B. Humphreys, as described in the patents previously herein mentioned, whereby the metallic mineral values of the flotation concentrate produced in accordance with the instant novel process are further concentrated by stratifying the mineral values in a helical concave trough of the type described by Humphreys in accordance with the specific gravity of the particular metallic minerals. Concentrates, rich in varying proportions of these materials and substantially free of silica and phosphate, may be advantageously obtained by such a procedure.

The instant novel process is particularly adaptable to the recovery of metallic minerals from a silica concentrate or float which is produced in a phosphate flotation circuit in accordance with methods which are presently employed in the phosphate industry in Florida. For example, a phosphate-silica ore containing less than about 0.5%, and usually less than 0.2% by weight of the metallic minerals previously mentioned herein, is ground to a finely divided state—for example, less than 35 mesh—and this material is subjected to a flotation operation for the concentration of phosphate values by employing a negative ion agent such as tall oil, conducting the flotation at a pH of at least above 8.0, preferably at a pH of between about 8.5 and about 9.0. The phosphatic float is washed with mineral acid to remove the reagents therefrom, and the washed material is subjected to a silica flotation operation with positive ion agent—for example, a mixture of high molecular weight aliphatic amines in the form of their water-soluble acid addition salts—thereby depressing the phosphate values and producing a concentrate or float comprising essentially silica, up to about 30% by weight of tricalcium phosphate, and between about 2 and about 4% by weight of metallic minerals of the type previously mentioned herein. The silica float containing positive ion agent is then further reagentized with negative ion agent such as tall oil. An acidic material such as sulfuric acid is added, and a flotation conducted at a pH between about 4 and about 5, in accordance with the procedures previously mentioned herein.

The invention will be more fully understood from a study of Figures I, II and III, which illustrate preferred methods of operation. Referring to Flow Sheet 1, deslimed phosphate ore of about −35 mesh size, indicated by the numeral 10, is mixed with a flotation agent composition containing a negative ion agent such as tall oil and delivered to a flotation unit 11 from which is recovered a silica fraction 12 and a phosphate rock concentrate 13 containing base-metal oxide minerals. The concentrate 13 is a slurry which is raised in solids content to about 75% solids at a dewatering station 14. Dewatered concentrate is conveyed to a mixing station 15 where sulfuric acid is added to remove flotation reagents. Concentrate is washed to neutrality at washing station 16. Following washing, the concentrate is delivered to a second flotation unit 17 where it is mixed with a positive ion flotation agent such as a long chain, aliphatic amine and aerated for flotation. From this flotation is recovered a phosphate concentrate or fraction 18 and a silica float 19 containing said minerals. Silica float 19 is conducted to a dewatering station 20 and then to a dereagentizing unit consisting of a mixing station 21 where sulfuric acid is added and washing station 22 where water is added until the silica product is nearly neutral. Dereagentized silica fraction 19 is delivered to a third flotation unit 23 where it is mixed with a negative ion flotation agent and aerated for flotation. From this flotation is recovered a float fraction 25 and a tail fraction 24. Mineral fraction 25 is delivered to a dewatering station 26 and then to a mixing station 27 where sulfuric acid is added. Upon dilution with water, the slurry of minerals from mixing unit 27 is delivered to a gravity concentration unit 28 where a tail fraction 29 and a mineral concentrate 30 is recovered for storage.

Figure II shows a modified mode of operation. A dereagentized silica plus base-metal oxide minerals float recovered as shown in Figure I as the product from washing station 22 is conducted to a flotation unit 40 where it is mixed with a negative ion flotation agent and aerated for flotation. From this flotation is recovered a tail fraction 41 and a mineral concentrate fraction 42. Mineral fraction 42 is delivered to a dewatering station 43 and then to a dereagentizing unit consisting of a mixing unit 44 where sulfuric acid is added and washing station 45. Dereagentized mineral fraction 42 is next delivered to another flotation unit 46 where it is again mixed with a negative ion flotation agent such as oleic acid and aerated for flotation. From this flotation is recovered a silica discard fraction 47 and a minerals float 48. Float product 48 is conducted to a dewatering station 49 and then to a dereagentizing unit consisting of a mixing station 50 where sulfuric acid is added and washing station 51 where water is added until the mineral material is neutral. The dereagentized base-metal oxide minerals concentrate is then conveyed to storage 52.

Figure III sets forth still another modification in the mode of operation. A silica plus base-metal oxide minerals float recovered as a product 19 of Flow Sheet 1 is conducted without removal of amine reagent to a flotation unit 60 where a negative ion agent such as the fatty acid, oleic acid, is added. This mixture, after dilution to about 25% solids content, is aerated for flotation. From this flotation is recovered a tail fraction 61 and a minerals fraction 62. Minerals fraction 62 is delivered to a dewatering station 63 and then is conducted to a dereagentizing unit consisting of a mixing station 64 where sulfuric acid is added and washing station 65 where water is added until the minerals concentrate is nearly neutral in pH. Dereagentized mineral fraction 62 is then delivered to a gravity concentration unit 66 from which is recovered a minerals concentrate which is delivered to storage.

However, the instant novel process is not limited to the recovery of metallic minerals from a concentrate produced by such a procedure, but may be adapted to recovery of such metallic minerals from phosphatic-siliceous ores wherein the metallic mineral content is in excess of 9.5%; for example, from ilmenite ore which occurs in Nelsonite in Nelson City, Virginia, and also in certain ore deposits in Arkansas. Nelsonite ore contains about 32% $TiO_2$, about 12% tricalcium phosphate, and about 5% by weight of silica. The ilmenite values in these and similar materials may be concentrated and isolated in accordance with the flotation and other concentration processes herein described.

In order to further illustrate the nature and character of the invention, but with no intention of being limited thereby, the following examples are recited:

Example I

A phosphatic rock, such as the type found in the phosphate rock areas of central Florida, is subjected to a washing operation in order to remove slimes and other organic matter. The washed rock in an aqueous pulp is subjected to a screening or hydraulic sizing operation whereby the larger particles of rock are segregated from material which is approximately −35 mesh. The latter material is then reagentized in an aqueous pulp containing about 60% solids with about one pound of a reagent comprising about 88% tall oil and about 12% kerosene per ton of ore treated. About 2 to 4 pounds of fuel oil is added, and sufficient caustic soda is added to the mixture to give the latter a pH of about 8.5 to 9.0. The resultant pulp is then subjected to a flotation operation at a solids content of about 25 to 40% by weight in a Fagergren machine, and a float is recovered containing approximately 60% tricalcium phosphate, about 30% silica, and about 0.5% of metallic minerals. This phosphatic product is then treated with about 2 pounds of sulfuric acid (60° Bé.) in order to remove the reagents therefrom. The acid-treated product is washed until it is substantially neutral, and is then reagentized in an aqueous pulp with a mixture of long-chain aliphatic amines, the latter comprising a mixture of about 73% of mono-octadecylamine and about 24% mono-hexadecylamine, together with small quantities of secondary and tertiary amines whose aliphatic groups contain between about 12 and about 18 carbon atoms. This reagent is preferably added in the form of acetic acid-addition salt. The reagentized product is then subjected to a flotation operation at a solids content as previously described, and the resultant float contains the majority of the silica, and about 2 to 4% by weight of metallic minerals is also obtained. This siliceous float is then slurried with water to form a pulp containing about 10 to about 25% by weight of solids, and this mixture is reagentized with about 0.5 pound of tall oil, about 0.5 pound of kerosene, and about 3.0 pounds of sulfuric acid (60° Bé.), the weights based upon one ton of solids in the pulp. The resultant reagentized siliceous product has a pH of about 4.5. This mixture is subjected to a flotation operation in accordance with the method previously described, and the float containing about 20% by weight of metallic minerals is obtained. This float has a solids content of about 15% by weight. This flotation step results in a 5.4 to 1 concentration of metallic minerals based upon the siliceous product subjected to flotation. The floated product is conveyed to a thickener wherein it is dewatered to produce a pulp of about 80% solids by weight. The resulting mixture is agitated with about 2 pounds of sulfuric acid (60° Bé.), thereby removing substantially all of the reagents from the solid product. The acid-treated material is washed until it is substantially neutral and is then reagentized with about 0.5 pound of oleic acid and about 0.7 pound of pine oil, these weights being per ton of solids content of the aqueous pulp. A sufficient amount of caustic soda is added to the reagentized product to give the resulting reagentized pulp a pH of about 7.2. A flotation operation is then conducted as previously described, and a float containing about 75% of metallic minerals is recovered. The tailings from this flotation operation contain only about 0.1% of metallic minerals, indicating the high degree of selectivity of the process and excellent recovery of such metallic materials. It may, therefore, be readily recognized that a phosphatic-siliceous material of less than 0.75% by weight of metallic minerals may now be treated in order to remove the major portion of such metallic mineral content by employing the specific flotation procedure which is the subject of the present invention.

The final float, containing about 75% by weight of metallic minerals, may be further treated by conventional methods in order to further up-grade the metallic minerals of the product and to separate the various metallic minerals from each other. In a preferred method, the final float is washed until it is substantially neutral. It is then dried to remove substantially all the water and subjected to a series of magnetic and electrostatic processes whereby the metallic minerals may be separated from each other based upon their individual dielectric or electromagnetic properties. By employing the latter type of operation, it is possible to separate ilmenite, rutile, and zircon from each other, substantially free from silica, phosphatic material, and other metallic minerals.

*Example II*

The following process illustrates the concentration of metallic minerals, of the type previously herein described, from phosphate-silica ores by means of a combined flotation and spiral or helical treatment.

About 2700 grams of a silica float, produced in the amine flotation process in accordance with phosphate recovery procedures previously described in Example I, and which assay about 3.5% by weight of metallic minerals, are treated, in an aqueous pulp containing about 75% solids by weight, with a mineral acid. About 2.0 pounds of sulfuric acid per ton of solids contained in the pulp is sufficient in order to remove the amine reagents from the silica float. The acid-treated product is washed until it is substantially neutral, and is then reagentized, in an aqueous pulp, with tall oil, employing about 0.7 pound of this reagent per ton of ore. A sufficient amount of caustic soda is added to the reagentized material to give the resultant pulp a pH of about 7.5. In addition, a frothing agent such as pine oil, which is not a collector for phosphate values, may be added in an amount of between about 0.2 and about 0.4 pound per ton of reagentized ore. A frothing agent is not required, but is occasionally beneficial. The resultant mixture is then subjected to a flotation operation, and a metallic mineral concentrate, which also contains phosphatic and siliceous materials, is obtained. The reagents are removed from this concentrate by agitating the same with sulfuric acid in an aqueous pulp containing about 75% by weight of solids. Normally, about 2 pounds of sulfuric acid per ton of reagentized ore will suffice. The acid-treated product is washed until it is substantially neutral, and is then allowed to proceed by gravity in a downward spiral path through a helical concave trough, placed in a vertical position, at a rate of between about 1 and about 5 tons of solids per hour. The feed to the spiral may conveniently contain between about 20 and about 40% by weight of solids, the remainder being water or other suitable liquid in which the solids are suspended. The spiral or helical apparatus, through which this aqueous suspension of minerals is fed, is formed by means of a trough which is constructed of any suitable material such as wood, metal, or plastic. No specific number of turns in the spiral pathway is required, but it is preferable to employ a spiral trough which contains about 5 turns to very six feet in height. The outside diameter of the curvature of the spiral may be about 24 inches, while the inside diameter may be about 6 inches. Conveniently, the slope of the spiral may be expressed as a drop of about 3 inches per foot of the trough; the latter being preferably more or less semi-circular in shape and containing a bottom which has a concave surface. The spiral pathway may contain one or more ports or exits whereby the metallic minerals may be drawn off at various stages or degrees of concentration. It has also been found expedient to include in the spiral pathway one or more riffles attached to the inner surface of the spiral trough. These riffles may be of any convenient height from the surface of the trough but, in general, good results are obtained by employing a riffle having a height of between about ⅟₁₆ inch and about ¼ inch. The riffle is positioned obliquely to the walls of the trough so as to direct the lower-density materials onto the high side of the concave trough, while the high specific gravity minerals—for example, ilmenite and rutile—remain along the inward side of the concave trough and are drawn off at convenient ports along the spiral pathway.

It has been found to be particularly advantageous to employ a series of "rougher" and "cleaner" spiral concentration operations whereby the concentrates and tailings from a particular spiral are further concentrated or recycled to a similar apparatus for further concentration. For example, a slurry containing about 35% by weight of suspended solids which contain about 2.5% by weight of metallic minerals is fed to a "rougher" spiral containing 40 five-turn spirals, at a rate of about 65 tons per hour. A concentrate containing about 8.0% by weight of metallic minerals is obtained, which amounts to about 3 tons per hour. A "middling" concentrate, containing about 2.5% by weight of metallic minerals at a rate of about 13 tons per hour, is also obtained. The "tailings" contain about 0.5% heavy minerals and are obtained at a rate of about 39 tons per hour. The concentrate, containing about 8.0% by weight of metallic minerals, is conducted to a "cleaner" spiral apparatus in an aqueous slurry containing about 35% by weight of solids. The "cleaner" spiral apparatus may contain 15 five-turn spirals arranged in series. The materials obtained from this operation are as follows:

1. Concentrate containing 30% by weight of metallic minerals.
2. "Middlings" concentrate, containing about 8% by weight of metallic minerals.
3. "Tailings", containing about 2.0% by weight of metallic minerals.

The "middlings" concentrate from this operation is recycled to the "rougher" spiral point in the process. The concentrates from the "cleaner" spiral are subsequently subjected to one or more "recleaning" spiral concentration steps, and a final concentrate is recovered which contains about 85% by weight of metallic minerals. The over-all recovery of metallic minerals, based upon the original metallic mineral content of the "rougher" float, is between about 60 and about 80% by weight.

It has been found that the metallic minerals of the type previously herein described may also be concentrated from phosphatic ore which contains said minerals by intercepting the phosphatic float from the first flotation section in a phosphatic ore recovery plant, "de-reagentizing" the float with a suitable acidic material such as sulfuric acid, and subjecting the resultant "de-reagentized" product, in an aqueous suspension, to the action of a spiral apparatus in a manner as outlined in Example II. Alternatively, the silica or amine float which is produced in the so-called "amine section" of a phosphate recovery flotation plant may be "de-reagentized" with a suitable acidic material; for example, sulfuric acid. The resultant "de-reagentized" material, which contains between about 2 and about 4% by weight of metallic minerals, is suspended in a liquid medium, preferably water, and subjected to a spiral concentration procedure as outlined in Example II. However, when operating in accordance with such methods, it has been found that the number of spirals which are required to achieve a sufficient concentration of metallic minerals from the phosphatic-siliceous ore is quite high, and in many cases economically prohibitive. It is, therefore, preferable to conduct at least one flotation step, at a pH between 7 and 8, inclusive, when negative ion agents are employed, and at a pH of about 4 to about 5 when a combination of negative and positive ion agents is employed, before further concentrating the metallic minerals by a spiral treatment.

The amount of negative and positive ion agents which are employed in the flotation steps which are an integral part of the instant novel process may vary according to the phosphatic or siliceous content of the metallic mineral-containing ore. The amount of negative ion agent which is employed to produce a flotation concentrate containing metallic minerals may vary over a fairly wide range, but between about 0.2 and about 2.0 pounds of negative ion agent per ton of solids in the flotation pulp has been found to be particularly advantageous. When conducting a flotation operation in the presence of positive ion agent—for example, long-chain aliphatic amines, such as octadecyl, dodecyl, lauryl, dioctyl, etc., or their water-soluble acid addition salts—at a pH between about 4 and about 5, the amount of such reagent may vary over fairly wide limits; but between about 0.1 and 1.0 pound of such reagent per ton of ore, based upon the solids content of the reagentized pulp, is conveniently employed. The amount of frothing agent such as pine oil, kerosene, fuel oil, etc., which is optionally present during flotation, may also vary over fairly wide limits; but between 0.05 and about 1.0 pound per ton of solids in a flotation pulp is conveniently employed. The type of reagent employed, and the particular pH within the prescribed pH ranges, will depend upon the metallic mineral concentration of the ore, the relative amounts of phosphate and silica contained therein, the state of sub-division of the ore particles, the solids content of the reagentized pulp, and upon other factors of which those skilled in the art are familiar.

While it has been found that reagents selected from the group comprising fatty acids, resin acids, red oil, tall oil, naphthenic acids, and the soaps of these reagents, are particularly advantageous when conducting a flotation operation at a pH of between 7 and 8, inclusive, the invention is not limited to such reagents, but any reagent which has an affinity for phosphate values may be employed. Similarly, reagents other than long-chain aliphatic amines or their water-soluble acid addition salts, such as those previously mentioned herein, are adaptable to flotation operations wherein both negative and positive ion agents are employed at a pH between about 4 and about 5.

It will be obvious to those skilled in the art of flotation of phosphate rock and other minerals that the selectivity of any particular reagents or mixtures of several reagents will not achieve a complete recovery of any particular desired mineral constituent of an ore. Similarly, in the flotation procedures which have been herein described for the recovery of metallic minerals from the phosphatic-siliceous ores, the selectivity of any reagent or group of reagents is not sufficient to achieve a complete recovery of the metallic minerals in the resulting float in any one flotation operation. As has been illustrated herein, it is frequently advantageous to recover the metallic minerals in a "rougher" float and refloat said "rougher" float at a pH between 7 and 8 in order to further selectively concentrate the metallic minerals. It is, therefore, within the scope of the invention to recycle or recirculate the "tailings" from any particular flotation operation, whether this be a "rougher" or a "cleaner" flotation, thereby achieving further recovery of the metallic minerals from such tailings in a subsequent flotation step. In this manner it has been possible to recover up to 85% of the metallic minerals which are contained in a phosphatic ore originally containing between about 0.05 and about 0.2% by weight of metallic minerals.

In the alternate or supplemental spiral process which is used for concentrating metallic minerals subsequent to a flotation procedure within the prescribed pH ranges as previously described herein, it is useful to recycle the concentrates, middlings, or tailings which are obtained in any one of a plurality of cleaner spiral operations. In this manner, certain metallic mineral concentrates which are obtained when several spiral operations are connected in series may be recycled to a spiral apparatus which is placed in an early section of the series. In this manner, spiral concentrates which contain a lower percentage of metallic minerals may be continuously beneficiated, thereby upgrading the metallic mineral content of such concentrates.

Obviously the invention is not limited to the procedural details nor to the specific reagents recited herein, but may be carried out by employing obvious extensions and modifications of the various factors as herein set forth.

I claim:

1. In a process of concentrating base-metal oxide type metallic minerals from phosphate-silica ores containing the metallic minerals in minor amounts, wherein the ore in a finely divided state is first subjected to a flotation operation employing carboxyl-containing negative ion agent to recover a phosphate-metallic minerals concentrate and the concentrate is subjected to a flotation operation employing nitrogenous positive ion agent to recover a silica-metallic minerals froth fraction, the improvement comprising subjecting said silica-metallic minerals fraction to at least one flotation operation in the presence of a reagent composition comprising at least one flotation collector reagent selected from the group consisting of carboxyl-containing negative ion agent, salts of said agent, and esters of said agent and adjusting the pH to separate a froth concentrate rich in metallic minerals.

2. In a process of concentrating base-metal oxide type metallic minerals from phosphate-silica ores containing the metallic minerals in minor amounts, wherein the ore in a finely divided state is first subjected to a flotation operation employing carboxyl-containing negative ion agent to recover a phosphate-metallic minerals concentrate and the concentrate is subjected to a flotation operation employing nitrogenous positive ion agent to recover a silica-metallic minerals froth fraction, the improvement comprising subjecting said silica-metallic minerals fraction to at least one flotation operation at a pH between about seven and about nine in the presence of a reagent composition comprising at least one flotation collector reagent selected from the group consisting of carboxyl-containing negative ion agent, salts of said agent and esters of said agent and adjusting the pH to separate a concentrate rich in metallic minerals.

3. In a process of concentrating base-metal oxide type metallic minerals from phosphate-silica ores containing the metallic minerals in minor amounts, wherein the ore in a finely divided state is first subjected to a flotation operation employing carboxyl-containing negative ion agent to recover a phosphate-metallic minerals concentrate and the concentrate is subjected to a flotation operation employing nitrogenous positive ion agent to recover a silica-metallic minerals froth fraction, the improvement comprising subjecting the silica-metallic minerals fraction to at least one flotation operation at a pH between about seven and about eight in the presence of a reagent composition comprising at least one flotation collector reagent selected from the group consisting of carboxyl-containing negative ion agent, salts of said agent and esters of said agent.

4. In a process of concentrating base-metal oxide type metallic minerals from phosphate-silica ores containing the metallic minerals in minor amounts wherein the ore in a finely divided state is first subjected to a flotation operation employing carboxyl-containing negative ion agent while at a pH between about seven and about nine to recover a phosphate-metallic minerals concentrate and the concentrate is subjected to at least one flotation operation employing nitrogenous positive ion agent to recover a silica-metallic minerals froth fraction, the improvement comprising subjecting the silica-metallic minerals fraction to at least one flotation operation at a pH between about seven and about eight in the presence of a reagent composition comprising at least one flotation collector reagent selected from the group consisting of carboxyl-containing negative ion agent, salts of said agent and esters of said agent.

5. In a process of concentrating base-metal oxide type metallic minerals from phosphate-silica ores containing the metallic minerals in minor amounts wherein the ore in a finely divided state is first subjected to a flotation operation employing carboxyl-containing negative ion agent while at a pH of at least higher than eight to recover a phosphate-metallic minerals concentrate and the concentrate is subjected to a flotation operation employing nitrogenous positive ion agent at a pH between about seven and about eight to recover a silica-metallic minerals froth fraction, the improvement comprising substantially removing the reagents from the silica-metallic minerals froth fraction by treating the same in an aqueous pulp with mineral acid, washing the acid treated concentrate until it is approximately neutral, subjecting the washed product to at least one flotation operation at a pH between about seven and about eight inclusive in the presence of at least one flotation collector reagent selected from the group consisting of carboxyl-containing negative ion agent, salts of said agent and esters of said agent.

6. In a process of concentrating base-metal oxide type metallic minerals from phosphate-silica ores containing the metallic minerals in minor amounts wherein the ore in a finely divided state is first subjected to a flotation operation employing carboxyl-containing negative ion agent to recover a phosphate-metallic minerals concentrate and the concentrate is subjected to a flotation operation employing nitrogenous positive ion agent to recover a silica-metallic minerals froth fraction, the improvement comprising subjecting said silica-metallic minerals froth fraction to flotation operations at a pH of at least higher than seven in the presence of a reagent composition comprising at least one flotation collector reagent selected from the group consisting of carboxyl-containing negative ion agent, salts of said agent and esters of said agent; treating each successive concentrate in an aqueous pulp with mineral acid, washing the acid treated product until it is substantially neutral prior to each flotation operation and recovering a final concentrate rich in metallic minerals.

7. In the recovery of base-metal oxide type metallic minerals from phosphate-silica ores containing less than about 0.5% by weight of said minerals after first subjecting the ore in a finely divided state to a flotation operation at a pH of at least higher than eight for the concentration of phosphate values with carboxyl-containing negative ion agent and subjecting the phosphatic float to a silica flotation operation with a long-chain aliphatic amine-acid addition salt, the improvements comprising substantially removing the reagents from the silica float by treating the same, in an aqueous pulp, with mineral acid; washing the acid-treated concentrate until it is approximately neutral; subjecting the washed product to a "rougher" flotation operation at a pH between about seven and about nine, in the presence of carboxyl-containing negative ion agent; separating a "rougher" concentrate; treating said concentrate, in an aqueous pulp, with mineral acid to substantially remove the reagents therefrom; washing the acid-treated concentrate until it is approximately neutral; subjecting the washed product to a flotation operation at a pH between about seven and about eight, inclusive, in the presence of a composition selected from the group consisting of fatty acids, natural resin acids, tall oil, red oil, naphthenic acids, and soaps thereof; and separating a concentrate rich in metallic minerals, treating the flotation concentrate in an aqueous pulp, with mineral acid, washing the acid treated product until it is substantially neutral, diluting the washed concentrate to between about 20% and about 40% solids with water and subjecting the diluted slurry to gravitational separation, thereby stratifying the mineral values according to their specific gravities and recovering a strata enriched in metallic minerals.

8. In the recovery of base-metal oxide type metallic minerals from phosphate-silica ores containing less than about 0.5% by weight of said minerals after first subjecting the ore in a finely divided state to a flotation operation for the concentration of phosphate values with carboxyl-containing negative ion agent at a pH of at least higher than eight and subjecting the phosphatic float to a silica flotation operation with nitrogenous positive ion agent, the improvements comprising substantially removing the reagents from the silica float by treating the same, in an aqueous pulp, with mineral acid; washing the acid-treated concentrate until it is approximately neutral; subjecting the washed product to at least one flotation operation at a pH between about seven and about eight, inclusive, in the presence of carboxyl-containing negative ion agent; and separating a concentrate rich in metallic minerals, treating the flotation concentrate in an aqueous pulp, with mineral acid, washing the acid treated product until it is substantially neutral, diluting the washed concentrate to between about 20% and about 40% solids with water and subjecting the diluted slurry to gravitational separation, thereby stratifying the mineral values according to their specific gravities and recovering a strata enriched in metallic minerals.

9. In a process of concentrating base-metal oxide type metallic minerals from phosphate-silica ores containing the metallic minerals in minor amounts wherein the ore in a finely divided state is first subjected to a flotation operation employing carboxyl-containing negative ion agent to recover a phosphate-metallic minerals concentrate and the concentrate is subjected to a flotation operation employing nitrogenous positive ion agent to recover a silica-metallic minerals froth fraction, the improvement comprising subjecting said silica-metallic minerals fraction to at least one flotation operation at a pH between about four and about five in the presence of a reagent composition comprising at least one long-chain aliphatic amine acid addition salt and at least one flotation collector reagent selected from the group consisting of carboxyl-containing negative ion agent, salts of said agent and esters of said agent, treating the recovered flotation concentrate in an aqueous pulp with mineral acid to substantially completely remove the reagents therefrom, washing the acid treated concentrate until it is approximately neutral, subjecting the washed product to the flotation operation at a pH between about seven and about eight inclusive in the presence of a composition selected from the group consisting of carboxyl-containing negative ion agent, salts of said agent and esters of said agent.

10. In a process of concentrating base-metal oxide type metallic minerals from phosphate-silica ores containing the metallic minerals in minor amounts wherein the ore in a finely divided state is first subjected to a flotation operation employing carboxyl-containing negative ion agent to recover a phosphate-metallic minerals concentrate and the concentrate is subjected to a flotation operation employing nitrogenous positive ion agent to recover a silica-metallic minerals froth fraction, the improvement comprising subjecting said silica-metallic minerals fraction to at least one flotation operation at a pH between about four and about five in the presence of a reagent composition comprising at least one long chain aliphatic amine-acid addition salt and at least one flotation collector reagent selected from the group consisting of carboxyl-containing negative ion agent, salts of said agent and esters of said agent; treating the flotation concentrate in an aqueous pulp, with mineral acid, washing the acid treated product until it is substantially neutral, diluting the washed concentrate to between about 20% and about 40% solids with water and subjecting the diluted slurry to gravitational separation, thereby stratifying the mineral values according to their specific gravities and recovering a strata enriched in metallic minerals.

11. In the recovery of base-metal oxide type metallic minerals from phosphate-silica ores containing less than about 0.5% by weight of said minerals after first subjecting the ore in a finely divided state to a flotation operation for the concentration of phosphate values with carboxyl-containing negative ion agent at a pH of at least higher than 8 and subjecting the phosphatic float to a silica flotation operation with nitrogenous positive ion agent, the improvements comprising substantially removing the reagents from the silica float by treating the same, in an aqueous pulp, with mineral acid; washing the acid-treated concentrate until it is approximately neutral; subjecting the washed product to at least one flotation operation at a pH between 7 and 8, inclusive, in the presence of carboxyl-containing negative ion agent and separating a concentrate rich in metallic minerals.

12. In the recovery of base-metal oxide type metallic minerals from phosphate-silica ores containing less than about 0.5% by weight of said minerals after first subjecting the ore in a finely divided state to a flotation operation at a pH of at least higher than 8 for the concentration of phosphate values with carboxyl-containing negative ion agent and subjecting the phosphatic float to a silica flotation operation with a long-chain aliphatic amine-acid addition salt, the improvements comprising substantially removing the reagents from the silica float by treating the same, in an aqueous pulp, with mineral acid; washing the acid-treated concentrate until it is approximately neutral; subjecting the washed product to a "rougher" flotation operation at a pH between 7 and 9, in the presence of carboxyl-containing negative ion agent having an affinity for phosphate values; separating a "rougher" concentrate; treating said concentrate, in an aqueous pulp, with mineral acid to substantially remove the reagents therefrom; washing the acid-treated concentrate until it is approximately neutral; subjecting the washed product to a flotation operation at a pH between 7 and 8, inclusive, in the presence of a composition selected from the group consisting of fatty acids, natural resin acids, tall oil, red oil, naphthenic acids, and soaps thereof; and separating a concentrate rich in metallic minerals.

13. In the recovery of base-metal oxide type metallic minerals from phosphate-silica ores containing less than about 0.5% by weight of said minerals after first subjecting the ore in a finely divided state to a flotation operation at a pH of at least higher than 8 for the concentration of phosphate values with carboxyl-containing negative ion agent and subjecting the phosphatic float to a silica flotation operation with a long-chain aliphatic amine-acid addition salt, the improvements comprising substantially removing the reagents from the silica float by agitating the same, in an aqueous pulp containing about 75% solids, with sulfuric acid in an amount equivalent to about two pounds of $H_2SO_4$ per ton of ore based on the solids content of the pulp; washing the acid-treated product until it is substantially neutral; subjecting the washed product to a flotation operation in the presence of between about 0.2 and about 2.0 pounds of tall oil per ton of solids, and caustic soda in sufficient amount to give the resultant flotation pulp a pH between 7 and 9; separating a "rougher" concentrate; agitating an aqueous pulp of said concentrate containing about 75% solids with sulfuric acid in an amount equivalent to about two pounds of $H_2SO_4$ per ton of ore based on the solids content of the pulp; washing the acid-treated product until it is substantially neutral; subjecting the washed product to a flotation operation in the presence of about 0.1 pound of pine oil per ton of solids, between about 0.15 and about 1.5 pounds per ton of solids of red oil, and caustic soda in sufficient amount to give the resultant flotation pulp a pH between about 7.3 and about 7.6; and separating a concentrate rich in metallic minerals.

JAMES E. LAWVER.

REFERENCES CITED

The following references are of record in the file of this patent:

UNITED STATES PATENTS

| Number | Name | Date |
|---|---|---|
| 2,105,807 | Crago | Jan. 18, 1938 |
| 2,120,485 | Clemmer | June 14, 1938 |
| 2,195,724 | Gaudin | Apr. 2, 1940 |
| 2,293,640 | Crage | Aug. 18, 1942 |

OTHER REFERENCES

Richards and Locke, "Text Book of Ore Dressing," Third Edition, (c) 1940 by McGraw-Hill Book Company, Inc., New York, page 260.

Taggart, Handbook of Mineral Dressing 1945, Section 12, pages 25, 29, 30, 31.